United States Patent
Hagen et al.

(10) Patent No.: US 8,465,683 B2
(45) Date of Patent: Jun. 18, 2013

(54) AGGLOMERATED STOVER FOR USE AS A LIQUID ABSORBENT

(75) Inventors: Tim Hagen, Superior, WI (US); George J. Coy, Mantorville, MN (US); Matthew Coy, Mantorville, MN (US)

(73) Assignees: Regents of the University of Minnesota, St. Paul, MN (US); Clean Plus, Inc., Concord, MN (US)

( * ) Notice: Subject to any disclaimer, the term of this patent is extended or adjusted under 35 U.S.C. 154(b) by 0 days.

(21) Appl. No.: 13/214,761

(22) Filed: Aug. 22, 2011

(65) Prior Publication Data

US 2012/0052298 A1   Mar. 1, 2012

Related U.S. Application Data

(60) Provisional application No. 61/377,686, filed on Aug. 27, 2010.

(51) Int. Cl.
*B29B 9/08* (2006.01)

(52) U.S. Cl.
USPC ........ 264/117; 23/313 R; 23/313 P; 502/401; 502/404

(58) Field of Classification Search
None
See application file for complete search history.

(56) References Cited

U.S. PATENT DOCUMENTS

| | | | | |
|---|---|---|---|---|
| 3,789,797 | A * | 2/1974 | Brewer | 119/173 |
| 5,762,023 | A * | 6/1998 | Carter | 119/173 |
| 5,891,937 | A | 4/1999 | Berg et al. | |
| 6,030,565 | A * | 2/2000 | Golan | 264/117 |
| 6,092,302 | A | 7/2000 | Berrigan | |
| 6,662,749 | B1 * | 12/2003 | Wiedenhaft et al. | 119/172 |
| 7,294,343 | B2 | 11/2007 | Barresi et al. | |
| 2003/0200935 | A1 * | 10/2003 | Hughes et al. | 119/171 |
| 2004/0086541 | A1 * | 5/2004 | Barresi et al. | 424/405 |
| 2006/0243212 | A1 * | 11/2006 | Jenkins et al. | 119/171 |
| 2011/0174228 | A1 * | 7/2011 | Liu | 119/173 |
| 2011/0232173 | A1 * | 9/2011 | Lefebvre | 47/9 |

* cited by examiner

*Primary Examiner* — Mary F Theisen
(74) *Attorney, Agent, or Firm* — Westman, Champlin & Kelly, P.A.; Z. Peter Sawicki

(57) ABSTRACT

This disclosure describes a method and apparatus for agglomerating stover to produce a liquid absorbing particle. The method comprises providing stover particles coated with a first binder component and then rolling the stover particles coated with the first binder component on a rotating surface. The rotating surface is inclined sufficiently to aid in the rolling of the stover particles. A second liquid binder component that readily chemically crosslinks with the first binder component is applied to the first binder component to produce a web that the stover particles adhere to. The web in combination with the inclined rotating surface rolls the stover particles thereby forming an agglomerated stover particle that will be suitable for absorbing liquids. Agglomerated stover particles are also described.

16 Claims, 11 Drawing Sheets

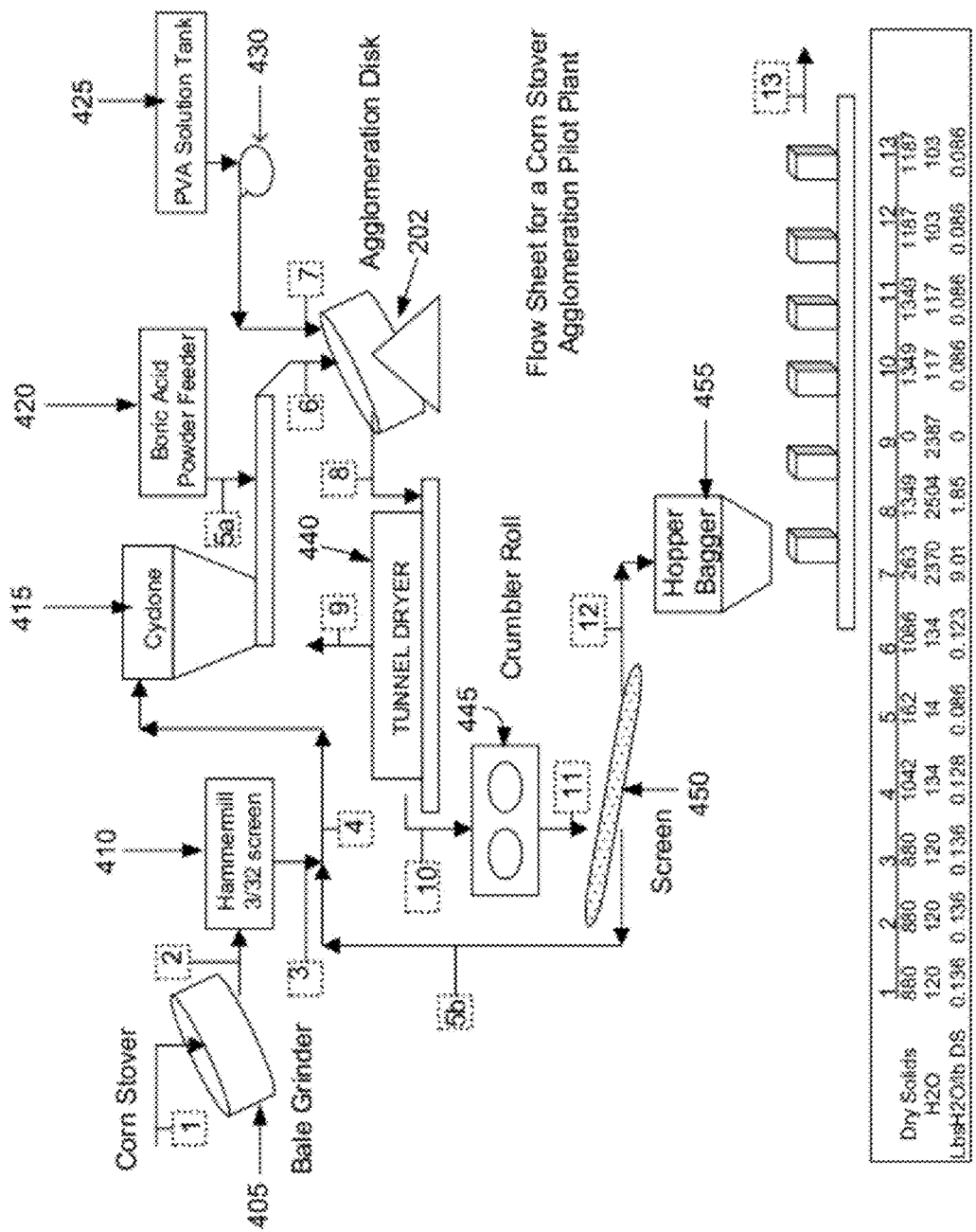

US 8,465,683 B2

AGGLOMERATED STOVER FOR USE AS A LIQUID ABSORBENT

CROSS-REFERENCE TO RELATED APPLICATION

The present application is based on and claims the benefit of U.S. provisional patent application Ser. No. 61/377,686, filed Aug. 27, 2011, the content of which is hereby incorporated by reference in its entirety.

GOVERNMENT RIGHTS

This invention was made with government support under 2009-33610-19649 awarded by the U.S. Dept. of Agriculture. The government has certain rights in the invention.

BACKGROUND OF THE INVENTION

The present application is based on and claims the benefit of U.S. provisional patent application Ser. No. 61/377,686, filed Aug. 27, 2010, the content of which is hereby incorporated by reference in its entirety.

This invention relates to the agglomeration of stover into particles suitable for use as a liquid absorbent.

For decades, hazardous liquids have dripped or been spilled on the floor of machine shops, manufacturing facilities, and auto repair and service shops. Clay granules have typically been used to absorb and clean up these liquids in household, commercial, and industrial applications. However, clay is inefficient, performs poorly, has high acquisition and transportation costs, and has high disposal and environmental costs.

Because of the negative implications that hazardous liquids have on the environment, attempts have been made to replace clay granules with other mediums. However, these attempts have not yielded successful results because end users are required to make significant changes in managing and cleaning up spills.

SUMMARY OF THE INVENTION

This disclosure describes a method for agglomerating stover to produce a liquid absorbing particle. The method comprises providing stover particles coated with a first binder component and then rolling the stover particles coated with the first binder component on a rotating surface. The rotating surface is inclined sufficiently to aid in the rolling of the stover particles. A second liquid binder component that readily chemically crosslinks with the first binder component is applied to the first binder component to produce a web that the stover particles adhere to. The web in combination with the inclined rotating surface rolls the stover particles thereby forming an agglomerated stover particle that will be suitable for absorbing liquids.

An apparatus for agglomerating stover particles is also disclosed. The apparatus comprises a disc rotatable about its axis. The disc comprises three tiers, concentrically disposed with respect to each other with an innermost tier being disposed at a lower position than an outermost tier. The stover particles when being agglomerated travel from the innermost tier to the outermost tier during rotation of the disc while the disc is positioned at an incline with respect to horizontal.

Additionally this disclosure describes an agglomerated liquid absorbing particle comprising stover particles having a mesh size of approximately 40 to 80 within a web comprised of a reaction product between boric acid and polyvinyl alcohol.

Further this disclosure describes an agglomerated liquid absorbing particle comprising stover particles having a mesh size of approximately 40 to 80 secured in a matrix of a reaction product between bentonite and guar gum.

BRIEF DESCRIPTION OF THE DRAWINGS

FIG. 10 is a diagrammatical view of a corn stover agglomeration pilot plant using BA/PVA.

DETAILED DESCRIPTION

Figure 1:
FIG. 1 is a photographical view of ground corn stover and agglomerates.

A novel two part binding system acts to faun a web onto which stover particles 102 adhere. When rolled additional stover particles 102 adhere to the web thereby creating an agglomerated stover particle 104. The web is formed as a result of crosslinking of liquid and solid portions of the binding system. The agglomerated stover particle 104, once dried, has an open porosity providing porous surfaces and pore volume for absorbing and retaining liquids. The agglomerated particle 104 has interstitial voids throughout which absorb liquid hydrocarbons and other liquids through capillary action. In particular, this disclosure describes a method of processing ground corn stover particles 102 as shown in FIG. 1 into lightweight, dust-free corn stover agglomerates 104 having desirable oil sorbency characteristics.

For purposes of this application, the word "stover" means plant material and in particular those leaves and stocks of corn (maize) or sorghum that are left in a field after harvest or are separated from the corn (maize) or sorghum during harvest. Corn stover is preferred. Stover can also include the leaves and stalks of soybean plants or for that matter straw which is the residue left after cereal grain or grass has been harvested at maturity for its seed. Soybean stover may not work as well as corn stover due to the amount of lignin in soybean stover. Cellulosic plant material having considerable lignin is generally not preferred.

Figure 2A:
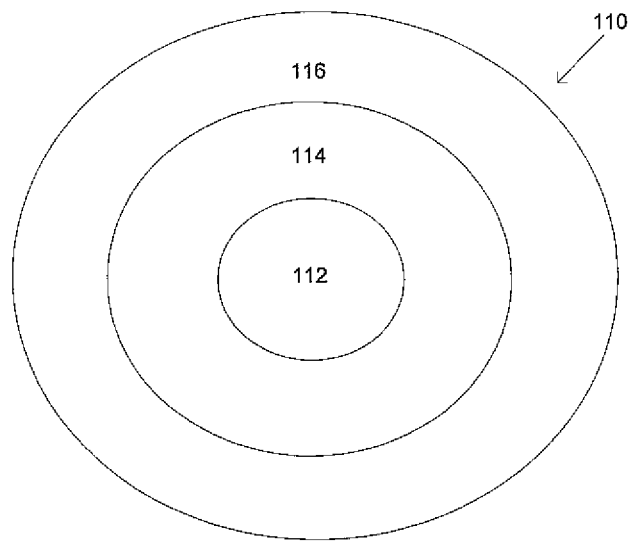
FIG. 2A is a frontal view of an agglomeration disk of this disclosure.
Figure 2B:
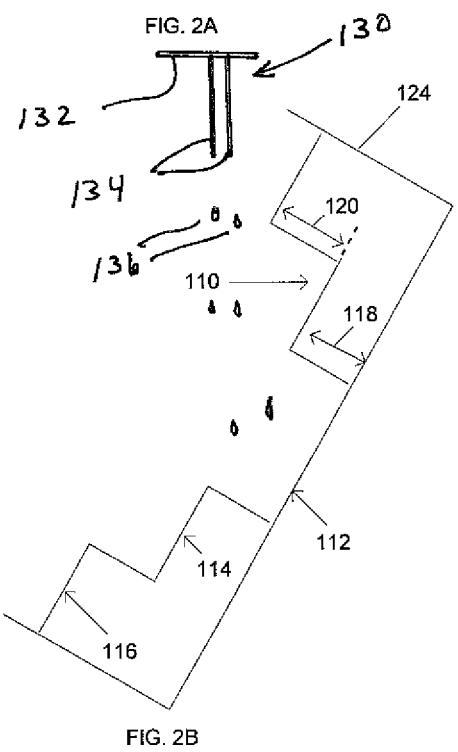
FIG. 2B is a sectional view taken of the disc illustrated in FIG. 2B

An important component of this disclosure is a rotating disc 110 illustrated in FIGS. 2A and 2B. The disc 110 is preferably tiered. For purposes of this application, the "tiered" means that the disc is partitioned into a multiplicity, preferably three, of levels or tiers, an innermost tier 112, an intermediate tier 114 and an outermost tier 116.

The innermost tier 112 is approximately 1 to 30 inches in diameter with a preferred dimension of approximately 15 to 25 inches. The rise in height 118 from the innermost tier 112 to the intermediate tier 114 is approximately 3 inches. The rise in height 120 from the intermediate tier 114 to the outermost tier 116 is also approximately 3 inches. Both the intermediate tier 114 and the outermost tier 116 are approximately 3 to 10 inches in width. In relation to the intermediate and the outermost tiers, the innermost tier occupies approximately 30 to 60% of the total disc diameter. One consideration in configuring the tiers of the disc 110 is to configure the tiers such that the agglomerating particles 104 migrate without breaking. The residence time of the agglomerating particles 104 on the disc 110 has to be sufficient to form a suitable particle but short enough so that the particle 104 does not destroy itself due its movement (migration) on the disc 110.

Although the disc 110 has been described with reference to discrete innermost, intermediate and outermost tiers, satisfactory results could also be obtained from a disc shaped in a continuous convex cross-section, that is, without discrete tiers defined by abrupt changes in height as illustrated in FIG. 2B.

The disc 110 also includes a lip 124 which rises approximately 1 ½ to 3 inches from the outermost tier 116.

Within the innermost tier 112, the rotational speed is slower than the intermediate tier 114 and much slower than the outermost tier 116. The slower rotational speed of the innermost tier 112 provides a good environment for initiating agglomeration.

The liquid second binding component is applied to the stover particles 101 in the innermost tier 112 with some of the application of the liquid second binding component even occurring on areas of the intermediate tier 114 that are nearest the innermost tier 112. The second liquid binding component is applied by dripping the component in discrete droplets 136. One suitable method of forming and delivering such droplets is through an apparatus 130 similar to apparatuses used to irrigate plants in a greenhouse. Typically such an apparatus is a low pressure feed system that includes a manifold 132 from which extend liquid delivery tubes 134. The liquid passage in the delivery tubes is reduced in size such that at the end of the delivery tube liquid droplets 136 form and then drop. The size of the formed web is dependent on the size of the droplet 136. Atomized droplets such as those formed from a liquid sprayer will not form a web suitable for the process discussed in this disclosure.

The frequency and the size of the droplet 136 will depend on the speed of rotation of the disc 110, the amount of stover to be agglomerated and other factors such as but not limited to the size and configuration of the disc 110. The adjustments needed in droplet size and frequency to make satisfactory stover agglomerates 104 are within one skilled in the art.

Virtually upon contact, the liquid binder component with the solid binder crosslinks and forms a web. Visually the web is similar to a spider web. Initially the stover particles 102 nearest where the droplet 136 engages the solid binder component are adhered to the forming web. As the web is rolled, more and more stover particles 102 are then adhered thereby initiating and continuing the formation of the agglomerated particle 104.

The stover particles 102 are formed by grinding stover, the stover initially being loose plant material or originating from a bale. The stover is ground to form stover particles 102 ranging from approximately 4 mesh to 80 mesh in size with a preferred size being between approximately 5 mesh and 20 mesh. Between 4 mesh to 80 mesh, the stover particles 102 have a density of approximately 8 lbs/cu ft.

Stover particles 102 being so light in weight are difficult to "roll" to form an agglomerated particle 104. The web formed from the two-part binding system of this disclosure provides a vehicle that enables the stover particles 102 to be rolled. The web that results from the chemical crosslinking between the first and second binder components form an interconnecting system of strands which, as mentioned above, visually resemble a spider web. As such, the stover particles 102 are trapped and are made to roll due to the web being formed by the binding system. The binder system also adds weight to the stover particles 102 thereby aiding the "rolling" of the light stover particles 102 to from an agglomerated particle 104.

As the liquid second binder component droplet 136 hits the solid binding component there is an immediate formation of the web. At the point of contact between the liquid binding component and the solid binding component, the stover particle 102 nearest this contact occurrence has a highinitial moisture content. However, as the web containing the stover particle 102 rolls, the moisture migrates to other loose stover particles 102 (which are coated with the second binding component) thereby forming additional web for continuing the agglomeration process. This process continues as the agglomerating particle 104 rolls and becomes larger.

As the agglomerated particles 104 form and become larger in the innermost tier 112, the agglomerating particles 104 then travel to the intermediate tier 114 due to the incline of the disc 110 and the result of the particles 104 becoming larger. Fines may also follow these growing agglomerated particles 104 to the intermediate tier 114, both loose stover fines and stover fines somewhat attached to the agglomerating particles 104. However, since these stover fines are loose or not very well attached to the agglomerated particles 104, the fines separate from the agglomerating particles 104 and travel up the intermediate tier 114 and cascade downwardly at an area of the intermediate tier 114 located approximately above the highest point of the innermost tier 112. The stover fines fall back into the innermost 112 tier to initiate agglomeration or to adhere to agglomerating stover particles 104. It was found on one particular disc 110 used that the fines cascaded down into the innermost tier 112 between the 12 o'clock and 1 o'clock positions as the disc 110 was rotating counterclockwise Between the intermediate tier 114 and the outermost tier 116, a similar process occurs. As the agglomerating particles 104 become larger, the particles overcome the height differential between the intermediate tier 114 and the outermost tier 116 and travel to the outermost tier 116. Any loose stover fines travel upwardly on the surface of the outermost tier 116 and cascade down into the intermediate tier 114 and then eventually to the innermost tier 112 if such stover fines do not attach to agglomerating particles 104 on the intermediate tier 114.

The outermost tier 116 of the disc is shallower and travels faster than the intermediate and innermost tiers, 114 and 112, respectfully. On the outermost tier 116 of the disc, polishing of the agglomerate particles 104 occurs during which further separation of fines occurs from the agglomerating particles 104.

By the time the agglomerated particles 104 exit off the disc 110 they are nearly 100% agglomerated particles 104 since stover fines, as discussed previously, have traveled up the disc 110 and have been returned to either the intermediate 114 or to the innermost 116 sections of the disc.

The moisture content of the agglomerated particle 104 as it exits the disc is between approximately 40 to 70% by weight with a preferred range of approximately 50 to 60% by weight. At this point in the process, the agglomerated particle 104 is referred to as a "green" particle. Adding too much liquid binder component at the beginning of the agglomeration process is not preferred since the final moisture content of the particle may be too high. One criterion for sufficient liquid binder component is that the agglomerated particle 104 retains sufficient integrity during its travel to the dryer. So enough liquid second binder component needs to be added in order to produce the "green" particle with sufficient strength/integrity to withstand travel to the dryer 222 until the particle 104 is sufficiently dried.

After the "green" particle exits the agglomerating disc 110, the particle undergoes a screening step to remove loose particles from the "green" agglomerates while keeping the integrity of the "green" particles. Preferably, the screen 212 is a vibrating screen, which gently separates loose particles from the "green" agglomerates 104.

After screening, the particle 104 is placed in a fluid bed dryer 222. Although a fluid bed dryer is specified, other drying systems are also within the scope of this disclosure. After drying, the agglomerated particle 104 is at full strength in terms of integrity.

After the "green" agglomerated particles are dried, the particles undergo a second screening step for removing undersized particles and oversized particles to obtain the desired particle size. The moisture content of the dried particles is from approximately greater than 0 to 15% and preferably from approximately 8 to 12% by weight. By greater than 0% is meant as little moisture as can be measured. For purposes of this application it is understood that the dried particles may never be able to achieve 0% moisture content. The bulk density of the dried particles ranges between approximately 4 to 10 lbs/cu ft and preferably between approximately 5 to 7 lbs/cu ft.

The agglomerated particles 104, once dried, have an open porosity and are sufficiently dry to entrain liquids such as liquid hydrocarbons. By hydrocarbons is meant those compounds which contain primarily hydrogen and carbon. For purposes of this application all liquid oils are within the meaning of liquid hydrocarbons. Also within the meaning of hydrocarbons for purposes of this application are those compounds that also include other elements such as oxygen, nitrogen, halogens, etc and are liquid. The dried agglomerated stover particles are sufficiently porous and the pore volume within the particle is sufficient to absorb and entrain most liquid hydrocarbons.

A boric acid/polyvinyl alcohol (PVA) binding system has been found as a preferred binding system. The amount of boric acid (solids) is approximately 3 to 30% by weight with a preferred range of 8 to 15% (solids) by weight and approximately 1 to 12% by weight of PVA (solids) with a preferred PVA amount of 3 to 8% (solids) by weight of the green agglomerate. The boric acid/polyvinyl alcohol (PVA) binding system produces the web as described herein. Other binding systems that produce a similar web are also contemplated as being part of this disclosure.

Another suitable binding system has been found to be bentonite/guar gum binding system. The amount of bentonite (solids) ranges from approximately 5 to 30% by weight with a preferred embodiment of approximately 8 to 15% (solids) by weight while the guar gum (solids) range from approximately 1 to 12% by weight with a preferred range of 2 to 7% guar gum (solids) by weight of the dried agglomerate. The preferred bentonite is sodium bentonite. However, calcium bentonite can also be used. The bentonite/guar gum binding system does not form a web such as the boric acid/polyvinyl alcohol (PVA) binding system, but instead forms an adhesive matrix that adheres the stover particles to each other in a manner that produces a porous particle having interstitial voids for absorbing liquid hydrocarbons and other liquids.

The following Example is intended as an illustration only. In the Example below a batch agglomeration system is used. The tiered disc described herein is part of a continuous process and is not described in the Example. The Example is included to describe several binder systems that were evaluated and to set forth further attributes of a suitable binder system and agglomerated particle. It will be understood that other modifications and variations to the process and apparatus not particularly described herein are within the scope of this disclosure.

EXAMPLE

Figure 3A:
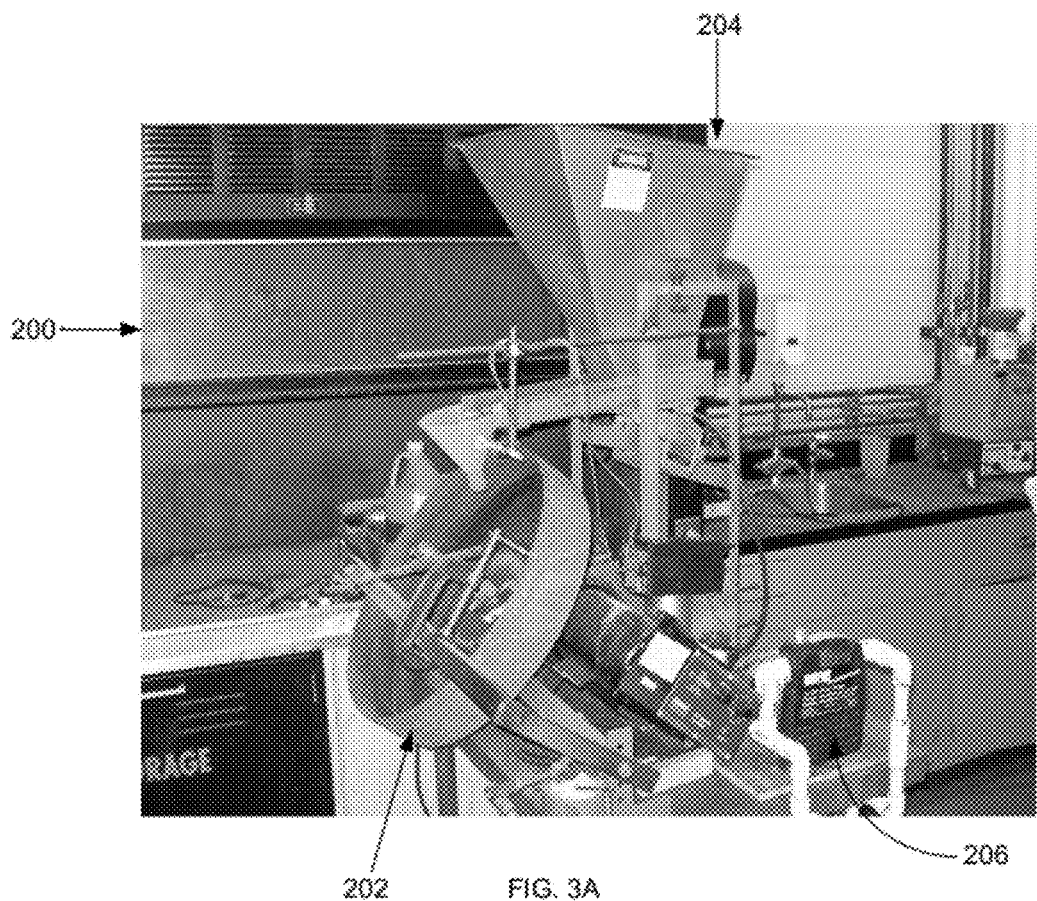
FIG. 3A is a photographical view of an agglomeration disc with a feeder and pump used in the Example.
Figure 3B:
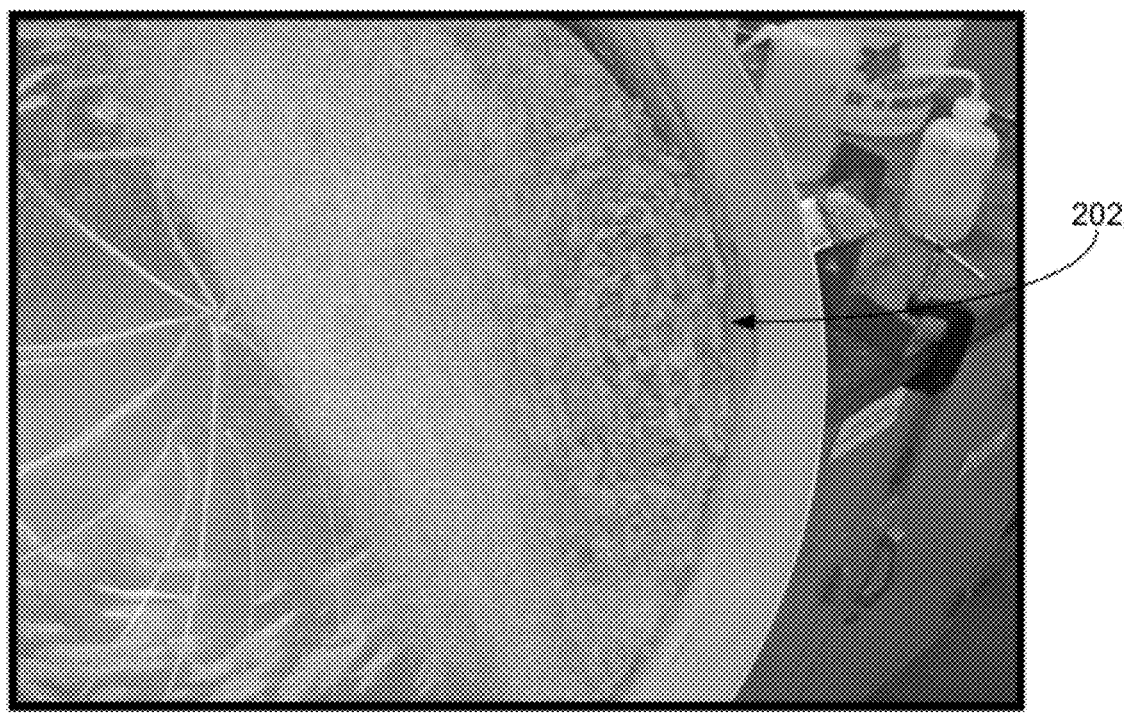
FIG. 3B is a photographical view of a portion of the agglomeration disc of FIG. 3A depicting the batch agglomeration process.

Ground corn stover particles as illustrated in FIG. 1 were coated with dry boric acid powder of a two-part binder system. The coated corn stover was then gently agglomerated into 4 to 8 trim beads having a very high open porosity whereby the cellular structure of the corn stover particles remained intact in an undensified, "non-collapsed" state. FIG. 3A illustrates an agglomeration setup 200 with disc 202, feeder 204, and pump 206. FIG. 3B is a partial photographical view of the agglomeration disc 202 of FIG. 3A depicting the batch agglomeration process. The coated ground corn stover is fed onto the disc 202 by the feeder 204 where the secondary binder solution (a 10% solution of PVA in water) is applied with the binder solution pump 206. As agglomeration disc 202 is rotated, desired corn stover agglomerates 104 are formed.

The specific preparation procedure used for each of the tested binder systems applied to the coated corn stover particles is detailed below.

Guar/Calcium Chloride ($CaCl_2$) System: A guar/$CaCl_2$ system was evaluated in batch mode by mixing approximately 1.2 grams of guar with about 30 gram of ground corn stover 102 and placing the mixed solids onto 20-inch agglomeration disc 202. An approximately 10% solution of $CaCl_2$ was then added dropwise onto rotating disc 202. After about 8 oz of agglomerates 104 had fowled, agglomerates 104 were gently screened and separated from the unagglomerated fines for further analysis.

Molasses/Lime System: A molasses/lime (CaO) system was evaluated in batch mode by mixing approximately 3.0 grams of powdered molasses with about 30 grams of ground corn stover 102 and placing the mixed solids onto 20-inch agglomeration disc 202. An approximately 10% solution of CaO in water was used as binder solution and added dropwise onto rotating disc 202. After about 8 oz of agglomerates 104 had formed, agglomerates 104 were gently screened and separated from the unagglomerated fines left in the disc 202 for further analysis.

Boric Acid (BA)/Polyvinyl Alcohol (PVA) System: A BA/PVA system was evaluated in batch mode by mixing approximately 3.0 grams of boric acid with about 30 grams of corn stover 102 and placing the mixed solids onto 20-inch agglomeration disc 202. An approximately 10% solution of polyvinyl alcohol was used as a binder solution and added dropwise onto rotating disc 202. After approximately 8 oz of agglomerates 104 had formed, agglomerates 104 were gently screened and separated from the unagglomerated fines left in the disc for further analysis.

Calcium sulphate ($CaSO_4$)/Sodium Silicate System: A $CaSO_4$/sodium silicate system was evaluated by mixing approximately 3.0 grams of $CaSO_4$ with about 30 grams of ground corn stover and placing the mixed solids onto a 20-inch agglomeration disc. An approximately 48% solution of sodium silicate was used as binder solution and added dropwise onto rotating disc 202. After approximately 8 oz of agglomerates 104 had formed, agglomerates 104 were gently screened and separated from the unagglomerated fines left in the disc for further analysis.

Guar/Bentonite System: A guar/bentonite system was evaluated by mixing approximately 1.2 grams of guar and about 4.8 grams of bentonite with approximately 30 grams of ground corn stover 102 and placing the mixed solids onto 20-inch agglomeration disc 202. Water was then added dropwise to the rotating disc 202 until approximately 8 oz of agglomerates 104 had formed. The agglomerates 104 were then gently screened and separated from and unagglomerated fines left in disc 202 for further analysis.

The five binder systems were evaluated based on one of the following six defined performance categories set forth below in Table 1.

TABLE 1

| Performance Categories | |
|---|---|
| Performance Category | Category Description |
| Wet Strength | Wet strength is measured by placing approximately 10 grams of wet agglomerates into a rotating rock tumbler containing an approximately 10-gram charge of steel ball bearings. The agglomerates are rotated for about 5 minutes and then screened at 8 mesh to separate the fines generated from the surviving agglomerates. Wet strength is reported as the proportion of wet agglomerates recovered from the tumbler after a 5 minute tumbling period. |
| Dry Strength | Dry strength is measured by placing approximately 10 grams of dry agglomerates into a rotating rock tumbler containing an approximately 10-gram charge of steel ball bearings. The agglomerates are rotated for about 5 minutes and then screened at 8 mesh to separate the fines generated from the surviving agglomerates. Dry strength is reported as the proportion of agglomerates recovered from the tumbler after a 5 minute tumbling period. |
| Sorbency Ratio | Sorbency ratio is measured by placing approximately 10 grams of dry agglomerates onto a screen and immersing into a 20-wt hydraulic oil for 5 minutes. After the 5-minute sorption period, the sample is removed from the oil and allowed to drain for 5 minutes. Sorbency ratio is reported as grams of oil absorbed by the 10-gram sample per gram of sorbent. |
| Binder Dosage | Binder dosage is reported as the fraction of total binder solids divided by the total solids placed in the agglomeration disc. |
| Agglomerate Moisture | Agglomerate moisture is reported as the percentage of water in the agglomerates on a wet weight basis {calculated as (wet weight – dry weight/wet weight) *100} |
| Agglomeration Efficiency | Agglomeration efficiency is reported as the percentage of dry solids recovered as agglomerates. |

The following rank and point system was developed in each performance category for the five different binder systems: $1^{st}$ place rank=50 points, $2^{nd}$ place rank=40 points, $3^{rd}$ place rank=30 points, $4^{th}$ place rank=10 points, and $5^{th}$ place rank=0 points. The performance and rank for each binder system is presented in Table 2 below.

TABLE 2

Agglomeration performance and rank for each binder system evaluated for corn stover.

| Performance Parameter | Guar/$CaCl_2$ | | | Molasses/lime | | | Boric acid/PVA | | | $CaSO_4$/Sodium Silicate | | | Guar/Bentonite | | |
|---|---|---|---|---|---|---|---|---|---|---|---|---|---|---|---|
| | Value | Rank | Points | Value | Rank | Points | Value | Rank | Points | Value | Rank | Points | Value | Rank | Points |
| Wet Strength Survival | 68% | 2 | 40 | 2.0% | 5 | 0 | 80% | 1 | 50 | 53% | 3 | 30 | 35% | 4 | 10 |
| Dry Strength Survival | 76% | 3 | 30 | 6.9% | 5 | 0 | 84% | 1 | 50 | 82% | 2 | 40 | 73% | 4 | 10 |
| Sorbency, g oil/g | 3.27 | 4 | 10 | 4.79 | 1 | 50 | 3.82 | 3 | 30 | 2.4 | 5 | 0 | 4.4 | 2 | 40 |
| Binder Dosage, g binder/g dry solids | 0.207 | 2 | 40 | 0.263 | 4 | 10 | 0.228 | 3 | 30 | 0.537 | 5 | 0 | 0.167 | 1 | 50 |
| Agglomerate Moisture | 61% | 4 | 10 | 51% | 2 | 40 | 58% | 3 | 30 | 44% | 1 | 50 | 67% | 5 | 0 |
| Agglomeration Efficiency | 61% | 3 | 30 | 51% | 5 | 0 | 69% | 2 | 40 | 55% | 4 | 10 | 76% | 1 | 50 |
| Point Total | — | — | 160 | — | — | 100 | — | — | 230 | — | — | 130 | — | — | 160 |

Based on the results of the batch agglomeration trials depicted in Table 2, the Boric Acid/Polyvinyl alcohol binder system received the greatest number of points and was selected for further continuous, steady state agglomeration trials. The guar/bentonite system most closely emulated the "look-and-feel" of conventional and commercially available clay granules.

To optimize agglomerate production, feed preparation requires proper attention. Feed entering agglomeration disc 202 should be consistent and properly prepared before being agglomerated into larger particles 104. Steady state agglomeration can be achieved with effective and consistent feed conditioning by hammer milling corn stover 102 to a consistent size specification. One of the first challenges encountered with corn stover agglomeration is the inability to achieve sufficient rolling, or 'tumbling' action in agglomeration disc 202 for coarser grinds. As inbound feed 102 particle size increases, some of the longer feed particles have a tendency to 'slide' down the angle of the disc 202, instead of tumbling or rolling down the angle of the disc 202. As feed particles 102 roll or tumble, and are simultaneously coated with the secondary binder solution 310 through the binder solution pump 206, the rolling particles attract other feed particles 102 and the desired agglomerate 104 begins to form. Three specifications for grind 102 out of the hammer mill were targeted minus ¼, minus 5/32, and minus 3/32 inch. Because the corn stover is so lightweight, the coated particles would characteristically slide on disc 202 rather than roll at grinds of minus ¼ and minus 5/32. It was then determined that the finer grind specification (3/32 inch) appeared to offer the best potential for further development and scale-up.

While this grind specification of 3/32 inch is an important consideration during the agglomeration process, the initial propensity of agglomeration in disc 202 appeared to only proceed at high moisture levels approaching 70% on a wet weight basis. Because polyvinyl alcohol and boric acid are known to form a cross-linked structure at low pH, a two-part binder system was devised to facilitate the early formation of agglomerates 104 at lower moisture levels. The following chemical formula is the likely cross-linking reaction between the hydroxyl groups of polyvinyl alcohol (PVA) and the borate ion.

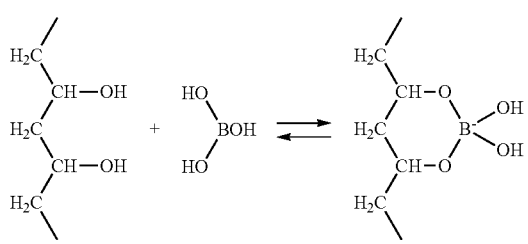

To optimally achieve the cross-linking reaction between the hydroxyl groups of PVA and the borate ion, boric acid powder was added in incremental dosages of 0, 5, 9, 11, and 13% to ground corn stover solids 102. Agglomeration trials for each of the dosages were conducted in 20-inch agglomeration disc 202 using approximately 12% PVA as a binder solution. The wet agglomerates 104 that exited agglomeration disc 202 were then collected, and the green strength and moisture of the agglomerates 104 were measured as set forth below in Table 3.

TABLE 3

Effect of boric acid dosage on green strength of corn stover agglomerates

| Boric acid Dosage, % of dry solids | PVA Binder solution, % solids | Green Strength Survival | Moisture of formed agglomerates, % |
|---|---|---|---|
| 0 | 12 | 8% | — |
| 5 | 12 | 38% | 55 |
| 9 | 12 | 42% | 55 |
| 11 | 12 | 51% | 56 |
| 13 | 12 | 76% | 57 |

As observed in Table 3, it was determined that the green strength was favorably affected by the addition of the boric acid.

The use of boric acid also creates agglomerates 104 with favorable flame retardant properties. To quantify boric acid's fire retardant properties, a burn trial was conducted in which approximately 20-gram samples of agglomerates 104 were set on fire underneath a flame hood over an approximately five-minute period. When no boric acid was used in the process, the entire agglomerate 104 was essentially consumed by flame as indicated by the results set forth below in Table 4. However, when boric acid was used at 5 or 10%, temperatures were reduced significantly and the agglomerates 104 exhibited less weight loss.

TABLE 4

Effect of boric acid on flame retardant properties of corn stover agglomerates

| Boric Acid Dosage, % | PVA | Initial weight (g) | Final wt. after 5 min, g | Temp at 1 Min (° F.) | Temp at 2 min (° F.) | Temp at 3 min (° F.) | Temp at 5 min (° F.) |
|---|---|---|---|---|---|---|---|
| 0 | 5 | 19.96 | 0.07 | 800+ | 800+ | 723 | 430 |
| 5 | 5 | 20.05 | 13.64 | 358 | 300 | 268 | 142 |
| 10 | 5 | 19.99 | 14.14 | 260 | 190 | 140 | 110 |

The inclusion of fines with agglomerates 104 increases sorbency ratio (SR) and improves surface residue value (SRV). SRV is a measurement of how well agglomerates 104 wick up oil from a surface. Approximately five milliliters of 20-wt hydraulic oil was placed onto a watch glass. About fifty milliliters of agglomerates 104 was then placed on top of the oil and allowed to wick for a period of five minutes. The dish was then inverted and tapped lightly to dislodge agglomerates 104. The material remaining in the dish was weighed and reported as the SRV. The inclusion of fines (particles smaller than 8 mesh) with agglomerates 104 likely increased the surface area contacting the oil, which proportionally increased both SR and the SRV as set forth below in Table 5.

TABLE 5

Relationship of screen size cut point on sorbency ratio and surface residue value.

| Binder System | Particle Size cut point % −8 mesh | % ⅜ × 8 | Sorbency ratio (SR), g oil/g sorbent | Surface Residue Value (SRV), g |
|---|---|---|---|---|
| BA/PVA | 5 | 95 | 5.47 | 0.03 |
| 12/10 Oven | 10 | 90 | 5.56 | 0.04 |
| dried to | 15 | 85 | 5.88 | 0.05 |
| zero % | 20 | 80 | 6.43 | 0.03 |
| moisture | 25 | 75 | 6.40 | 0.05 |
| BA/PVA | 5 | 95 | 5.19 | 0.08 |
| 12/10 Air | 10 | 90 | 4.94 | 0.06 |
| Dried to | 15 | 85 | 5.35 | 0.06 |
| 10% | 20 | 80 | 5.65 | 0.04 |
| moisture | 25 | 75 | 5.93 | 0.07 |

As demonstrated by Table 5, the sorbency ratio generally increased in response to the proportion of fines in the mixture with the boric acid and PVA positioned at 12 and 10% respectively. Therefore, whether the agglomerates were dried to oven dry conditions or to nominal 10% levels, any dry fines (smaller than 8 mesh) recovered in the process after any drying or crumbling step could favorably be dosed back into the product for maximum SR and SRV. From Table 3, it appears that the SR peaks are near 20% inclusion of fines. Taking into consideration that the proportion of fines included with agglomerates 104 has to be balanced against their propensity to generate dustiness upon usage, it is believed that positioning the fines at or near 15% offers a reasonable balance between dust minimization and sorbency performance.

A challenge often associated with the continuous operation of agglomeration disc 202 is the downstream handling and conveyance issues associated with moving the wet agglomerates 104 prior to the drying step. Wet corn stover agglomerates 104 are delicate and must be handled in a way that minimizes any degradation or attrition losses expected from conveyance or handling equipment. It was determined that running green strength of agglomerates 104 must be sufficient such that agglomerates 104 can survive or withstand downstream handling prior to any drying step. In selecting a binder system, proper consideration must be given for the development of green strength in agglomerates 104.

Figure 4:
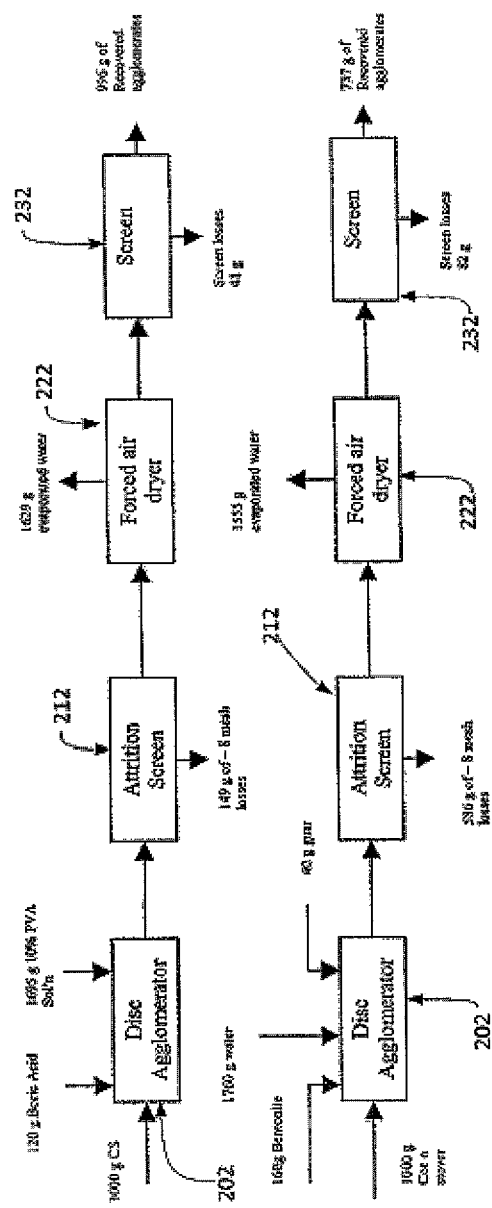
FIG. 4 is a schematic view of steady-state trials of the boric acid/polyvinyl alcohol (BA/PVA) and guar/bentonite systems.

As illustrated in FIG. 4, a series of steady state runs were performed on the BA/PVA and guar/bentonite binder systems to evaluate each system's green strength of agglomerates 104. Handling issues were emulated by vibrating and moving agglomerates 104 from disc agglomerator 202 across 8-mesh screen 212. Easily sloughed off particles fall through screen 212 and provide an indication on the durability of wet agglomerates 104. After agglomerates 104 were dried in forced air dryer 222, agglomerates 104 were screened at second 8-mesh screen 232 to track the total losses of unagglomerated fines. For the BA/PVA system, of the approximately 1000 grams of corn stover agglomerates that entered agglomeration disc 202 on a steady-state basis, only 149 grams of attrition losses were recorded after passing through first screen 212 and 41 grams lost after passing through second screen 232. Conversely, for the guar/bentonite system, of the approximately 1000 grams of corn stover agglomerates that entered agglomeration disc 202 on a steady-state basis, 586 grams of attrition losses were recorded after passing through first screen 212 and 82 grams lost after passing through screen 232. The lack of green strength for agglomerates 104 using the guar/bentonite binder system provided grounds for eliminating the binder system from further consideration and justified further optimization trials for the BAf-PVA binder system.

Figure 5:
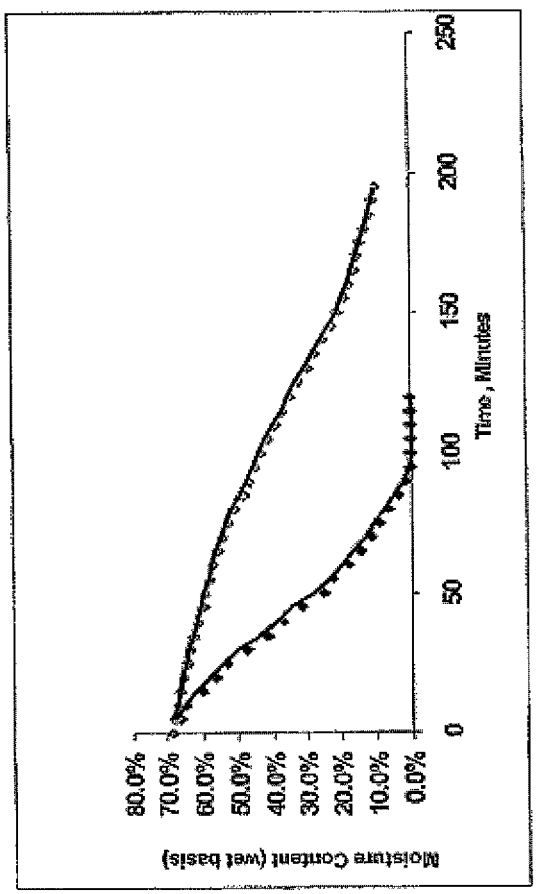
FIG. 5 is a graphical view of the rate of drying curve for corn stover agglomerates at 70° versus 130° F.
Figure 6:
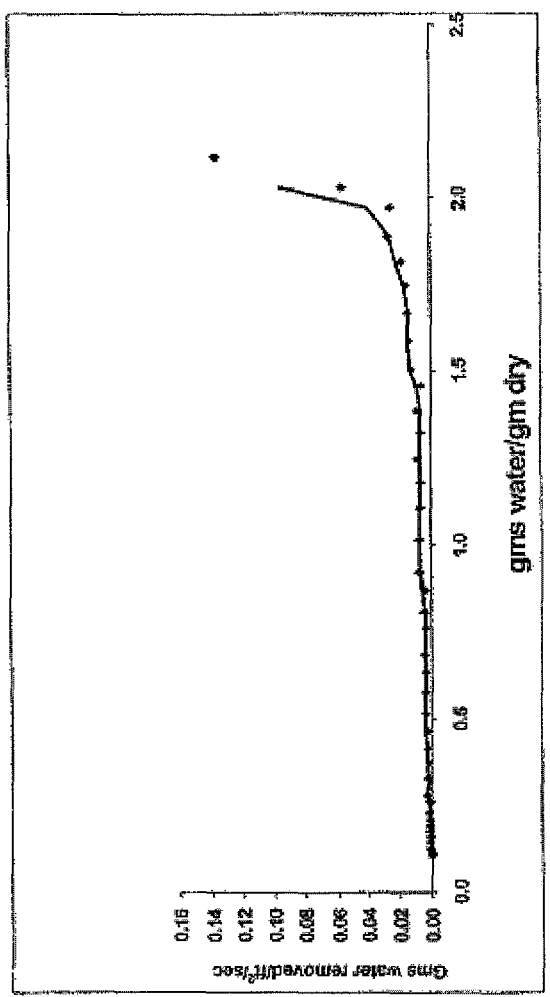
FIG. 6 is a graphical view of the drying curve for corn stover agglomerates (350 CFM, 70° F., 1.24 ft$^2$×2 inches deep).
Figure 7:
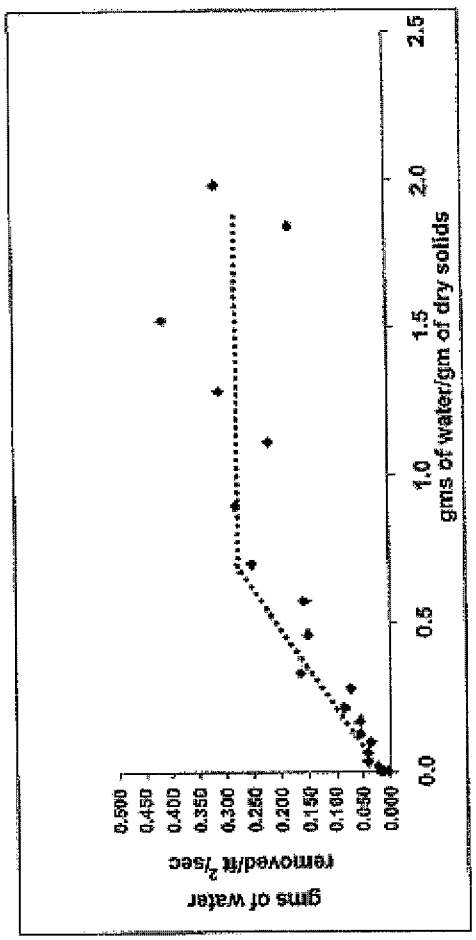
FIG. 7 is a graphical view of the drying curve for corn stover agglomerates (350 CFM, 130° F., 1.24 ft$^2$×2 inches deep).
Figure 8:
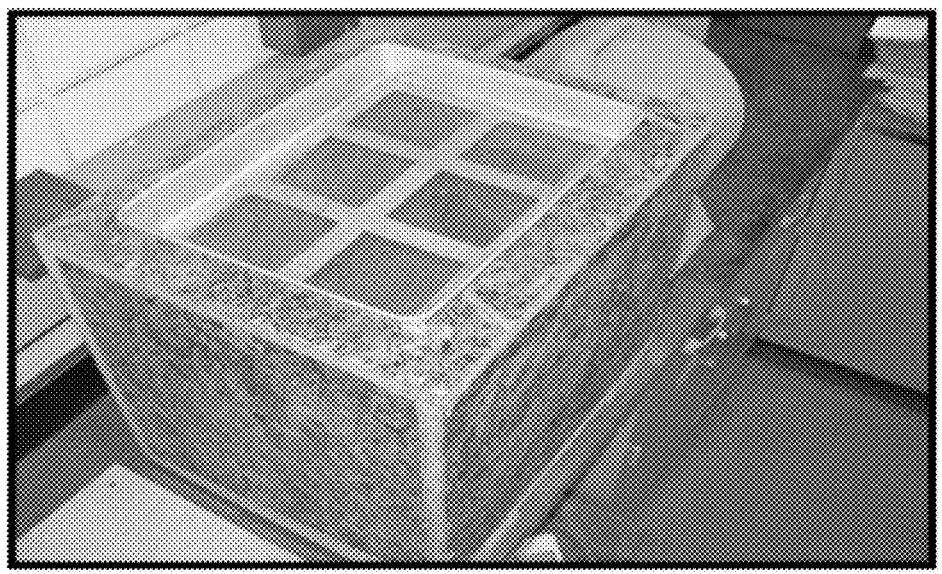
FIG. 8 is a photographical view of a static bed for drying agglomerates.

The rate of drying curves developed for corn stover agglomerates 104 are shown in FIG. 5, FIG. 6, and FIG. 7. These curves illustrate the diffusion limiting factors of removing water from corn stover agglomerates 104 and also indicate the energy required to remove moisture from agglomerates 104. FIG. 5 shows the rate of drying curve as a function of time at approximately 70° F. and approximately 130° F. for corn stover agglomerates 104 at a starting moisture level of about 69% (wet weight basis). Results show the time required to achieve a level of approximately 10% moisture (wet weight basis) in the product with airflow of about 350 cubic feet per minute (CFM) through a 2-inch deep bed of agglomerates 104 is about 195 minutes at approximately 70° F. and about 75 minutes at approximately 130° F. FIG. 8 depicts the static bed used for drying agglomerates 104.

The data is further presented as fluxes in FIG. 6 and FIG. 7 as grams of water removed per ft$^2$ per second as a function of water remaining in solid agglomerates 104. A much greater rate of drying was achieved at approximately 130° F. as shown in FIG. 7 as compared with FIG. 6 at approximately 70° F. The trend line displayed in FIG. 7 shows that a constant drying rate of about 0.25 grams of water removed/ft$^2$/sec is achieved on the first part of the curve and then declines to a falling rate period. The initial point of decline occurs at a critical moisture content of about 0.80 grams water/gram dry solids. At this point, the surface film of moisture on agglomerates 104 have been so reduced by evaporation that further drying causes dry spots to appear on product 104. This data gives rise to the falling rate period that essentially ends at the equilibrium moisture content of near 0.10 grams water/gram dry solids 104. The shape of the drying curve in FIG. 7 generally shows that water releases from agglomerate 104 quite readily and that diffusion-limiting factors are not likely to be a concern for larger scale drying operations.

The energy required to dry corn stover agglomerates 104 was measured across an approximately 1.24 ft$^2$ fixed bed at a constant air flow of about 350 CFM at approximately 70° F. and approximately 130° F. utilizing an approximately 2-inch bed of agglomerates 104. The bed of agglomerates 104 was weighed initially and at five-minute intervals until moisture levels of about 10% (wet weight basis) were achieved. Air was provided by a 300-Watt fan and heat provided by a 1500-watt electric heater. The energy consumed during this drying process is displayed below in Table 6.

TABLE 6

Energy Consumption during Drying Process

| Measured Parameter | 350 CFM at 70 F. | 350 CFM at 130 F. |
|---|---|---|
| Initial weight in Bed | 1522 g | 1538 g |
| Final weight in bed at 10% moisture | 522 g | 524 g |
| Net water removed from product | 1000 g | 1014 g |
| Time to get to 10% moisture | 195 min | 75 min |
| Bed Area | 1.24 ft$^2$ | 1.24 ft$^2$ |
| Fan wattage rating | 300 watts | 300 watts |
| Heater wattage rating | NA | 1500 watts |
| Energy consumed | 3327 BTU | 7679 BTU |
| Energy used to evaporate water | 1510 BTU/lb water removed | 3438 BTU/lb water removed |

The results show that with ambient air at about 350 CFM through an approximately 2-inch static bed of corn stover agglomerates 104, the energy used to evaporate the water is 1510 BTU/lb water removed with ambient air at approximately 70° F. and 3438 BTU/lb water at approximately 130° F. Typical fluid bed dryers operate in the range of 1200 to 2300 BTU/lb water removed, while rotary flash dryers operate in the range of 1600 to 3600 BTU/lb water removed depending on the material being dried. Although the values obtained for the drying trials on corn stover 104 (1510 BTU/lb and 3438 BTU/lb water removed) are within the typical dryer ranges, further improvements in energy consumption would likely have been possible with gentle tumbling action or with a fluidized drying approach where particles are constantly kept in motion.

Several operating variables for agglomeration disc 202 need to be monitored to achieve a consistent, uniformly sized output. These factors include, the location of where the ground corn stover feed is positioned in disc 202, the rate at which the feed is introduced to disc 202, the fineness of grind for the feed, the initial moisture of the incoming feed, the location of where the liquid binder is introduced onto disc 202, the slope of disc 202, and the edge speed of disc 202.

Figure 9:
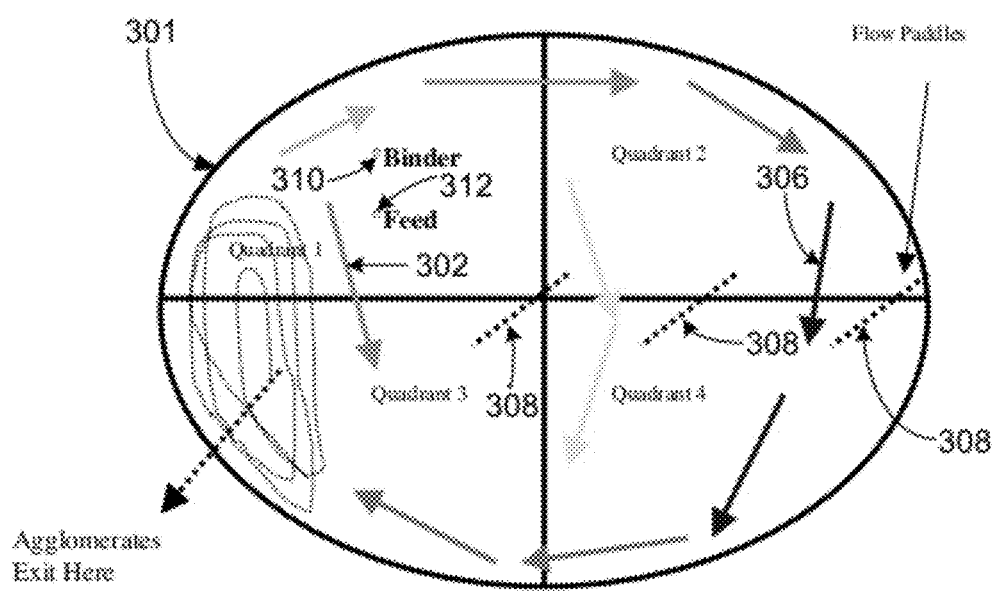
FIG. 9 is a diagrammatical view depicting the recommended flow paths for the agglomeration of corn stover.

To yield consistent agglomerates 104 of about ⅛ to ⅜ inch in size, the coated ground corn stover feed was introduced onto disc 202 in the upper left side quadrant 301 at feed point 312 of FIG. 9. In addition, it is desirable to achieve three separate flow paths 302, 304, and 306 in the disc 202 by positioning flow paddles 308 as shown in FIG. 9. Further, the liquid binder should be added at a point 310 just above the feed point 312 when using disc 202.

To provide the best rolling action for the lightweight feedstock 102 to efficiently create desired agglomerates 104, the slope of agglomeration disc 202 should be maintained between approximately 55 and 62 degrees from horizontal and the edge speed of disc 202 should operate between about 235 and 255 ft/min.

FIG. 10 is a diagrammatical view of a contemplated corn stover agglomeration pilot plant. Each unit operation of the process is shown in FIG. 10 along with stream numbers 1-13 to and from each piece of equipment. Stream numbers 1-13 are depicted at the bottom of the figure showing the proportion of water and dry solids entering and leaving each stream.

FIG. 10 was developed based on an incoming flow of corn stover at approximately 1000 lbs per hour and received moisture of approximately 12% (wet weight basis).

As depicted in FIG. 10, the agglomeration process starts by adding round bales of corn stover 102 (approximately 12% moisture (wet weight basis)) to bale grinder 405 which breaks the bale into smaller pieces for further processing. The broken pieces of stover 102 are then transported through an augur in stream 2 to a hammer mill equipped with a 3/32-inch screen 410. The feed 102 passing through the hammer mill screen 410 exits in stream 3 and is pneumatically transported and mixed with recycle stream 5b and enters cyclone 415 through stream 4. The throughput of solids 102 through the hammer mill screen 410 and from the double deck screening machine 450 is aided by pneumatic suction provided by cyclone 415. The ground solids 102 then exit cyclone 415 through an air lock and augur combination where a powder feeder 420 adds the required amount of boric acid through stream 5a. After significant mixing action through the auger, boric acid and corn stover solids enter agglomeration disc 202 in stream 6. PVA solution at approximately 10% solids is pumped from solution tank 425 and then added to the disc through the binder solution pump 430 in stream 7 to effect particle agglomeration. Wet agglomerates 104 exit disc 202 through stream 8 containing approximately 1.85 lbs water/lb dry solids and enter tunnel dryer 440. Approximately twenty three hundred eighty seven (2387) lbs of evaporative water are released in stream 9, while approximately 1466 lbs of agglomerates 104 exit the dryer 440 through stream 10. A paddle conveyor in stream 10 feeds agglomerates 104 to a crumbler roll 445, which then releases the feed 104 onto double deck screen 450 through stream 11. The fines generated at double deck screen 450 can then either be pneumatically recycled back to cyclone 415 or mixed proportionally back in with the agglomerates 104. The agglomerates 104 exit in stream 12 and enter hopper bagger 455. Approximately twelve hundred ninety (1290) lbs of finished agglomerates 104 leave the process through stream 13.

A detailed description of the equipment used in FIG. 10 is set forth below in Table 7.

TABLE 7

| Equipment Used during Agglomeration Process | | | |
| --- | --- | --- | --- |
| Equipment | Manufacturer (if possible) | Description | Capacity |
| Bale Grinder | Valmetal 'Bale Master', or similar Valmetal Industries Saint-Germam-de-Grantham, Québec CANADA | Bale master bale buster, capable of grinding bales of corn stover to ~ 2 inch spec | 1000 lb/hr |
| Auger | Farm King 6" × 10', or similar Farm King Industries, Morden, Manitoba CANADA | 10 ft screw auger, 6 in dia. | 1000 lb/hr |
| Hammer Mill | Stedman Type 'A', or similar Stedman Machine, Aurora, IN | 15 HP, 10,000 fpm tip speed, 3450 RPM, radial hammers | 1000 lb/hr |
| Conveyance line | Cyclonair, or similar. Cyclonair, York, NE | 6 inch, 350 ft | 1176 lb/hr |
| Cyclone/Blower | Cyclonair, or similar, Cyclonair, York, NE | 20 HP Blower, 11,000 CFM | — |
| Air lock/Hopper | Cyclonair, or similar. Cyclonair, York, NE | 2 hr surge capacity | — |
| Volumetric Feeder | K-Tron, model K20, or similar K-Tron International, Inc. Pitman, NJ | Boric acid powder feeder | 44 lb/hr |
| Pump tank and Pump | Shur-Flo 2088 Series, or similar Shur-Flo, Inc. Cypress, CA | 500 gallon capacity, ½ hp | 5.5 gpm at 20 psi |
| 4 ft agglomeration disc. | FEECO or similar Feeco, International Green Bay, WI | 48" agglomeration disc., w/feed chute positioners and distribution manifold, 10 HP | 2 ton per hr capacity |
| Tunnel Dryer | Ventilex fluid bed dryer, or similar Ventilex USA Inc. Middletown, Ohio | Tunnel dryer, Propane fed, 3 HP drive | 6 MMBtu/hr |

TABLE 7-continued

Equipment Used during Agglomeration Process

| Equipment | Manufacturer (if possible) | Description | Capacity |
| --- | --- | --- | --- |
| Crumbler roll | Roskamp Series 999, or similar Roskamp Champion Waterloo, IA | 3 HP, single roll | Up to 2 ton/hr |
| Double Deck screen | Midwestern Uniflex, or similar Midwestern Industries, Inc. Massillon, OH | 2 ft × 3 ft, 3 HP Motor | Up to 2 ton/hr |
| Hopper/Bagger Combination | Thiele Series 7102, or similar Thiele Technologies Minneapolis, MN | Volumetric bagger, 1 ft³/bag, Nominal 4 bag/min rating | 4 to 6 bag/min rating Up to 1 ton/hr |
| Take away Conveyor | Thiele Series 3318, or similar Thiele Technologies Minneapolis, MN | Nominal 3 to 6 fpm, 16" wide × 10 ft long, ½ HP | — |

After carrying out the agglomeration setup shown in FIG. 10, the following agglomeration process scale-up factors were determined: 1290 lbs finished product/2633 lbs of binder solution at 10% solids, 2387 lbs of evaporative water/1290 lb finished product, 44 lbs boric acid/1290 lb finished product, and 880 lb dry corn stover solids/1290 lb finished product.

In summary using the process and apparatus described in the Example, light weight, dust-free corn stover agglomerates 104 having desirable oil sorbency characteristics were created by gentle agglomeration and rolling action. The agglomerated corn stover fiber 104 has approximately 5.5 times more sorbency, produces significantly less ash, and provides more recoverable energy than conventional and commercially available clay-based absorbents and has much greater green strength than do other binder systems. Finally, the structure of agglomerates 104 allows liquid hydrocarbons such as oil and other fluids to wick into its porous structure.

Although the present invention has been described with reference to preferred embodiments, workers skilled in the art will recognize that changes may be made in form and detail without departing from the spirit and scope of the invention.

What is claimed is:

1. A method for agglomerating stover to produce a liquid absorbing particle, the method comprising:
   providing stover particles coated with a first binder component; and
   applying a liquid second binder component to the stover particles and rolling the stover particles coated with the first binder component on a rotating surface, the liquid second binder component chemically cross-linking with the first binder component to produce a web to which the stover particles adhere and the rotating surface being inclined sufficiently to effect the rolling of the web and to effect adherence of additional stover particles thereby forming the liquid absorbing particle.

2. The method of claim 1 wherein the formed liquid absorbing particle has a moisture content of approximately 40 to 70% by weight.

3. The method of claim 2 wherein the formed liquid absorbing particle has a moisture content of approximately 50 to 60% by weight.

4. The method of claim 2 and further comprising drying the formed liquid absorbing particle.

5. The method of claim 4 wherein the dried liquid absorbing particle has a moisture content of approximately greater than 0 to 15% by weight.

6. The method of claim 5 wherein the dried liquid absorbing particle has a moisture content of approximately 8 to 12% by weight.

7. The method of claim 4 wherein the dried liquid absorbing particle has a bulk density between approximately 4 to 10 pounds per cubic foot.

8. The method of claim 7 wherein the dried liquid absorbing particle as a bulk density between approximately 5 to 7 pounds per cubic foot.

9. The method of claim 4 wherein the dried particle is porous.

10. The method of claim 1 wherein the first binder component is boric acid.

11. The method of claim 10 wherein the liquid second binder component is polyvinyl alcohol.

12. The method of claim 11 wherein concentration of the boric acid solids comprises approximately 3 to 30% by weight and concentration of the polyvinyl alcohol (solids) comprises approximately 1 to 12% by weight.

13. The method of claim 12 wherein the concentration of the boric acid solids comprises approximately 8 to 15% by weight and the concentration of the polyvinyl alcohol (solids) comprises approximately 3 to 8% by weight.

14. The method of claim 1 wherein the rotating surface comprises a multiplicity of tiers, concentrically disposed with respect to each other, with an innermost tier being disposed at a lower position than the outermost tier and wherein the stover particles are initially provided to the innermost tier.

15. The method of claim 14 the liquid second binder component is applied within the innermost tier of the rotating surface.

16. The method of claim 15 wherein the liquid second binder component is applied in droplet form.

* * * * *